United States Patent [19]

Hellenbrand et al.

[11] Patent Number: 5,096,596

[45] Date of Patent: Mar. 17, 1992

[54] PROCESS AND APPARATUS FOR REMOVAL OF MINERAL CONTAMINANTS FROM WATER

[75] Inventors: Terence P. Hellenbrand; Jeffrey J. Hellenbrand, both of Waunakee, Wis.

[73] Assignee: Hellenbrand Water Conditioners, Inc., Waunakee, Wis.

[21] Appl. No.: 544,328

[22] Filed: Jun. 27, 1990

[51] Int. Cl.$^5$ ............................................. C02F 1/64
[52] U.S. Cl. ..................... 210/721; 210/722; 210/771; 210/806; 210/807; 210/202; 210/209; 210/218; 210/259; 210/295
[58] Field of Search ............... 210/722, 209, 669, 771, 210/279, 665, 284, 290, 218, 202, 668, 912, 721, 266, 259, 806, 807, 295

[56] References Cited

U.S. PATENT DOCUMENTS

| | | | |
|---|---|---|---|
| 1,100,675 | 6/1914 | Hackl | 210/722 |
| 1,990,214 | 2/1935 | Zapffe | 210/722 |
| 2,128,311 | 8/1938 | Mertes | 210/722 |
| 2,237,882 | 4/1941 | Lawlor et al. | 210/722 |
| 2,439,764 | 4/1948 | Walker | 210/722 |
| 3,649,532 | 3/1972 | McLean | 210/722 |
| 4,139,456 | 2/1979 | Yabmuchi et al. | 210/722 |
| 4,430,228 | 2/1984 | Paterson | 210/722 |
| 4,534,867 | 8/1983 | Kreusch et al. | 210/722 |
| 4,659,463 | 4/1987 | Chandler et al. | 210/722 |
| 4,818,404 | 4/1989 | McDowell | 210/630 |
| 4,826,601 | 5/1989 | Spratt et al. | 210/620 |
| 4,885,084 | 12/1989 | Doyle | 261/DIG. 75 |
| 4,966,692 | 10/1990 | Overy | 210/541 |
| 4,992,181 | 2/1991 | Siebert | 210/744 |

OTHER PUBLICATIONS

Iron Curtain System, diagram of System Manufactured by Hellenbrand Water Conditioners, Inc. of Waunakee, Wis.

Primary Examiner—Stanley S. Silverman
Assistant Examiner—Cynthia L. Nessler
Attorney, Agent, or Firm—Lathrop & Clark

[57] ABSTRACT

An apparatus for removing mineral contaminants from water is disclosed which has an aeration tank connected to a supply of water and having an inlet for admitting the water to the aeration tank and an outlet for discharging water. A diffuser is connected to the aeration tank inlet and has a plurality of apertures which permit the diffusion of the contaminated water into an airhead within the aeration tank. A source of compressed oxygen is in direct communication with the top of the aeration tank. A controller controls the source of compressed air to permit oxygen to be supplied independently of the water supply to the interior of the aeration tank for recharging the aeration tank with oxygen. A bed of calcium carbonate chips may be positioned inside the aeration tank beneath the spray of contaminated water. A pick-up tube has an open end located above the bed of calcium carbonate chips and is connected to the outlet of the aeration tank. A filter tank has an inlet connected to the pick-up tube of the aeration tank and an outlet adapted to be connected to a water supply line. The system has a distributor tube connected to the outlet of the filter tank with an opening within the multimedia filter bed, wherein the oxygenated water may be drawn through the multimedia filter bed so that a significant portion of the contaminants may be removed from the water and the filtered water may be supplied to the outlet of the filter tank. The system has a multimedia filter bed positioned within the filter tank which has a plurality of filtration layers.

10 Claims, 7 Drawing Sheets

PROCESS AND APPARATUS FOR REMOVAL OF MINERAL CONTAMINANTS FROM WATER

FIELD OF THE INVENTION

The present invention relates to an apparatus and process for filtering water in general, and to an apparatus and process for removing iron, manganese and sulfur from well water in particular.

BACKGROUND OF THE INVENTION

Well water commonly contains naturally occurring mineral contaminants. Iron, sulfur, and manganese frequently are found in well water giving undesirable odors and taste to the water. These mineral contaminants may also stain plumbing fixtures and corrode pipes.

Mineral contaminants are commonly removed from water by entraining air in the raw water and passing the aerated water through a bed of calcium carbonate or dolomite to raise the pH level of the water and facilitate precipitation of the undesirable minerals. The increased pH water may then be passed through one or more filter media to remove the precipitated contaminants. Commonly oxygen is added to the raw water by passing the water through a pipe section of decreasing cross-sectional area with an air inlet known as a venturi nozzle.

Water treatment apparatuses employing venturi nozzles for aeration of raw water present certain difficulties in service and operation. Strainers will commonly have to be installed upstream of the venturi nozzle to remove sediment in the water which would obstruct the nozzle. Care must be taken to maintain the correct differential pressure between the pump or water supply and the pressure tank of the system to insure proper venturi operation. Furthermore, air introduced upstream of the pressure tank may cause pipes to plug ahead of the pressure tank. Furthermore, the strainer and venturi increase the pressure drop on the water system, which may have an effect on the needed amount of water for backwashing the system.

In addition to the maintenance and operation difficulties associated with venturi nozzles, the venturi may only operate when water is flowing through the system. Although it is known to substitute an air pump for a venturi in a filtration system, such systems remain dependent on the flow of the water supply to bring fresh oxygen to the water.

What is needed is a water filtration apparatus which supplies the oxygen for the necessary aeration of the raw water to produce satisfactory oxidation of the unwanted minerals without reducing available water pressure and which is not susceptible to clogging or degradation due to water flow.

SUMMARY OF THE INVENTION

The apparatus for removing mineral contaminants from water of this invention has an aeration tank with a top and an inlet at the top for admitting water from a supply of water to the aeration tank and an outlet for discharging water. A diffuser is located within the tank through which water from the inlet is sprayed within the aeration tank. An airhead exists within the aeration tank into which the contaminated water is sprayed. A source of compressed oxygen-rich gas is in direct communication with the top of the aeration tank and a means for controlling the source of compressed oxygen-rich gas permits oxygen to be supplied independently of the water to the interior of the aeration tank for recharging the aeration tank with oxygen. A pick-up tube has an open end located within the aeration tank and is connected to the outlet of the aeration tank. A filter tank has an inlet connected to the pick-up tube of the aeration tank and has an outlet adapted to be connected to a water supply line. A multimedia filter bed is located within the filter tank and has a plurality of filtration layers. A distributor tube is connected to the outlet of the filter tank with an opening within the multimedia filter bed. Oxygenated, water may be drawn through the multimedia filter bed so that a signficant portion of the contaminants may be removed from the water and the filtered water may be supplied to the outlet of the filter tank.

DESCRIPTION OF THE PREFERRED EMBODIMENT

Figure 1:
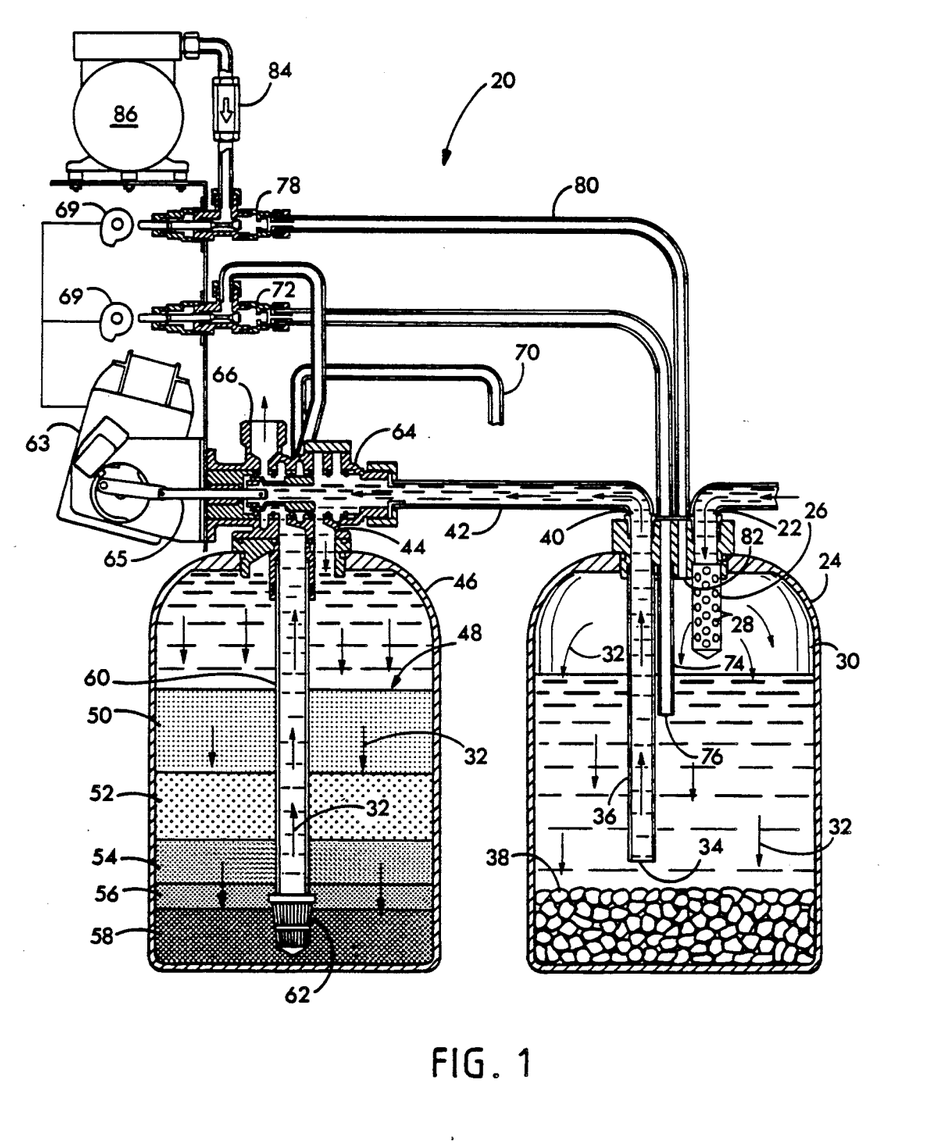
FIG. 1 is a schematic sectional view of the water filtration apparatus of this invention in a service position with arrows indicating the direction of water flow.

Referring more particularly to FIGS. 1-7, wherein like numbers refer to like parts, the Water Filtration System 20 is shown in a service position in FIG. 1. Raw water containing the unwanted mineral contaminants normally from city mains or a well, is delivered to the system 20 under pressure. The raw water enters the inlet 22 of the pressurized aeration tank 24 and flows down through an inlet diffuser 26. The diffuser 26 may be a splash plate, but is preferably a tube with a plurality of holes 28 which spray the raw water through an air head 30 of 6 to 18 inches within the aeration tank 24.

The flow of the water in FIG. 1 is indicated by the arrows 32. As the water passes through the air head 30, it absorbs oxygen and begins the oxidation process for iron, manganese and hydrogen sulfide. The water sprayed from the diffuser 26 gathers in the tank 24 and is forced up into the inlet 34 of the pick-up tube 36. The inlet 34 is located just above a bed 38 of calcium carbonate chips in the bottom of the aeration tank 24. This causes turbulance in the water flow in and around the bed 38 of calcium carbonate chips. The pH level of the aerated water may be increased as it enters the inlet 34 above the bed 38 of calcium carbonate chips. An increased pH level facilitates the precipitation of the mineral contaminants.

The aeration tank 24 is preferably sized so that the aerated water which enters through the inlet diffuser 26 remains within the tank for a minimum of two minutes at the rated system flow of the system 20, before the water is picked up by the pick-up tube 36. The water leaves the aeration tank 24 through the pick-up tube 36 which is connected to the outlet 40 of the aeration tank 24 and connected by a connecter tube 42 to the inlet 44 of a filter tank 46.

Located within the filter tank 46 is a multimedia filter bed 48. The multimedia filter bed 48 will generally be comprised of five successive layers of different filter media. The top layer 50 is made up of aluminum silicate of the type manufactured by Clack Corporation of Windsor, Wis. and known by the trade name Filter-Ag, which has lightweight particles with a mesh size of 0.6 millimeters and a dry density weight of 25 pounds per cubic foot. The second layer 52 contains manganese dioxide-coated pumicite such as that manufactured by the Clack Corporation under the trade name Birm, which is a slightly heavier media with a mesh size of 0.49 millimeters and a dry density weight of 50 pounds per cubic foot. The third layer 54 contains fine filter sand, which has an effective mesh size of 0.44 millimeters and a dry density weight of 100 pounds per cubic foot. The fourth layer 56 is composed of garnet sand with an effective mesh size of 0.3 millimeters–0.4 millimeters and a dry density weight of 135 pounds per cubic foot. The fifth layer 58 is a garnet support bed to retain the previous four layers, 48–56, so that they do not pass through the distribution system. The support bed 58 has an effective mesh size of 8–12 millimeters and a dry density weight of 135 pounds per cubic foot.

A sixth layer of magnesia (not shown) may be used in those applications with a lower pH influent value than 6.8. The magnesia increases influent pH values as low as 6.0 to effluent levels of 6.8 or greater. The magnesia may be of the type manufactured by Clack Corporation of Windsor, Wis. and known by the trade name Corosex, which has an effective mesh size of 1.3 millimeters and a dry density weight of 100 pounds per cubic foot. This medium is self sacrificial and gets smaller with use. In low pH influent level applications, the magnesia layer would be located beween the layers of Birm 52 and fine filter sand 54.

The water from the inlet 44 of the filter tank 46 flows through the five layers 50, 52, 54, 56, 58 and is drawn into a distributer tube 60 which has an inlet 62 located within the support bed 58. The multimedia filter bed 48 removes the fully-oxidized iron, manganese and hydrogen sulfide contaminants from the water. The filtered water exits through the distributor tube 60, passes through the filter valve 64 and through the outlet 66. The filtered water supplied from the outlet 66 may then be utilized in other components of a plumbing system.

A controller 63 controls the flow of water and air through the system 20 by automatically adjusting the positions of the drain valve 72, the recharge valve 78, and the filter valve 64. The controller may be a microprocessor with any type of switch for actuating the various valves, but it is preferably an analog clock driven device which adjusts the positions of the valves 72, 78 by rotating the cams 69 and the position of the filter valve 64 by adjusting the position of the valve piston 65. The controller 63 is preset to change the positions of the valves 64, 72, 78 within the system 20 to most efficiently filter the water from a particular source taking into account the hours of the day during which demands for filtered water will be placed on the system 20.

Figure 2:
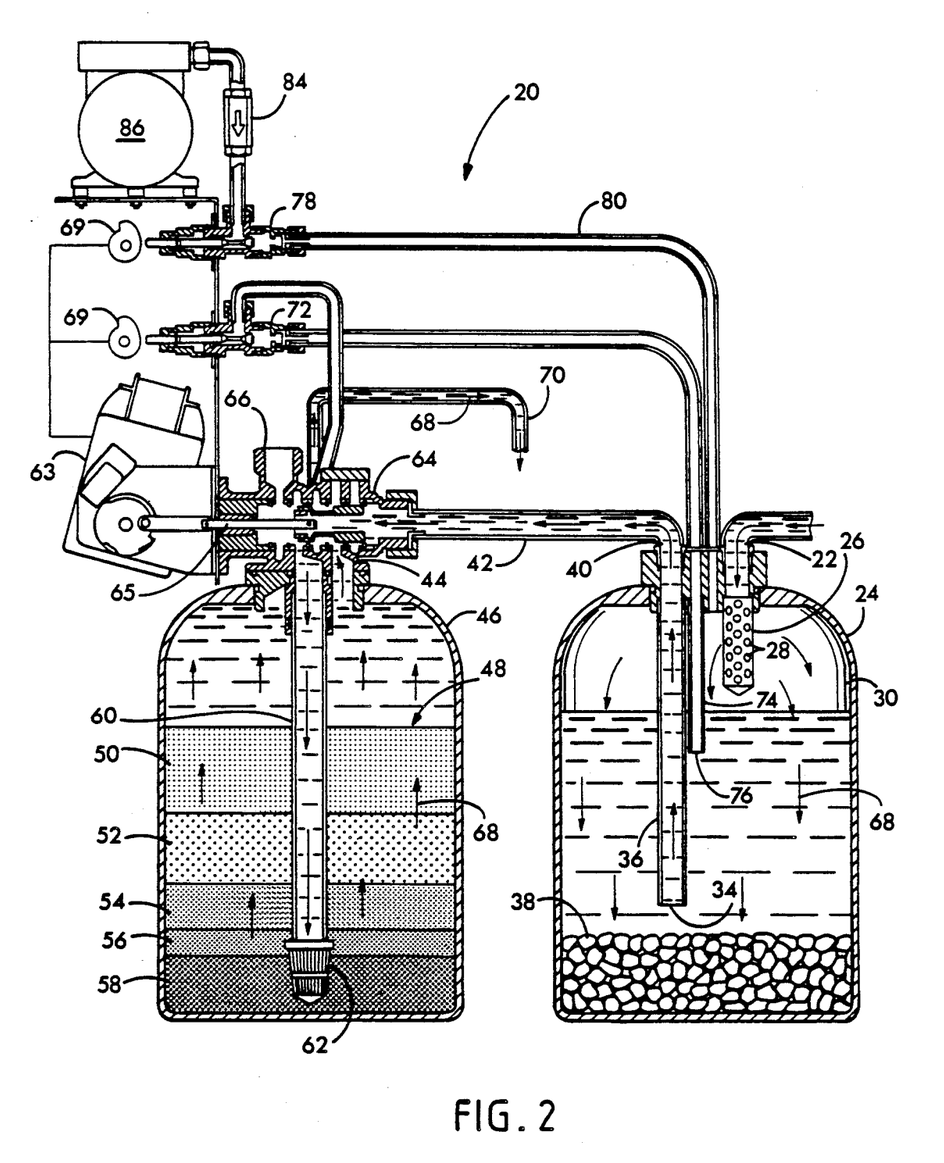
FIG. 2 is a schematic sectional view of the apparatus of FIG. 1 in the backwash position with arrows indicating the direction of water flow.

After prolonged operation of the filtration system 20, there will be a build-up of oxidized iron, manganese and hydrogen sulfide contaminants in the multimedia filter bed 48. To clear these contaminants from the filter tank 46, the filter valve piston 65 is shifted to cut off service and backwash the filter tank as shown in FIG. 2.

The arrows 68 indicate the direction of water flow during backwash of the filter tank. Raw water from the aeration tank 24 enters the inlet 44 of the filter tank 46 and flows through the filter valve 64 down through the distributor tube 60 and out the inlet 62 of the distributor tube 60 where it is injected into the support bed 58 of the multimedia filter bed 48 and is forced upward through the five layers of the multimedia filter bed 48. The raw water forces the oxidized contaminants which were removed during the service cycle out of the filter bed 48 and through the filter valve 64 where it is directed out a drain tube 70 where it is disposed of.

Figure 3:
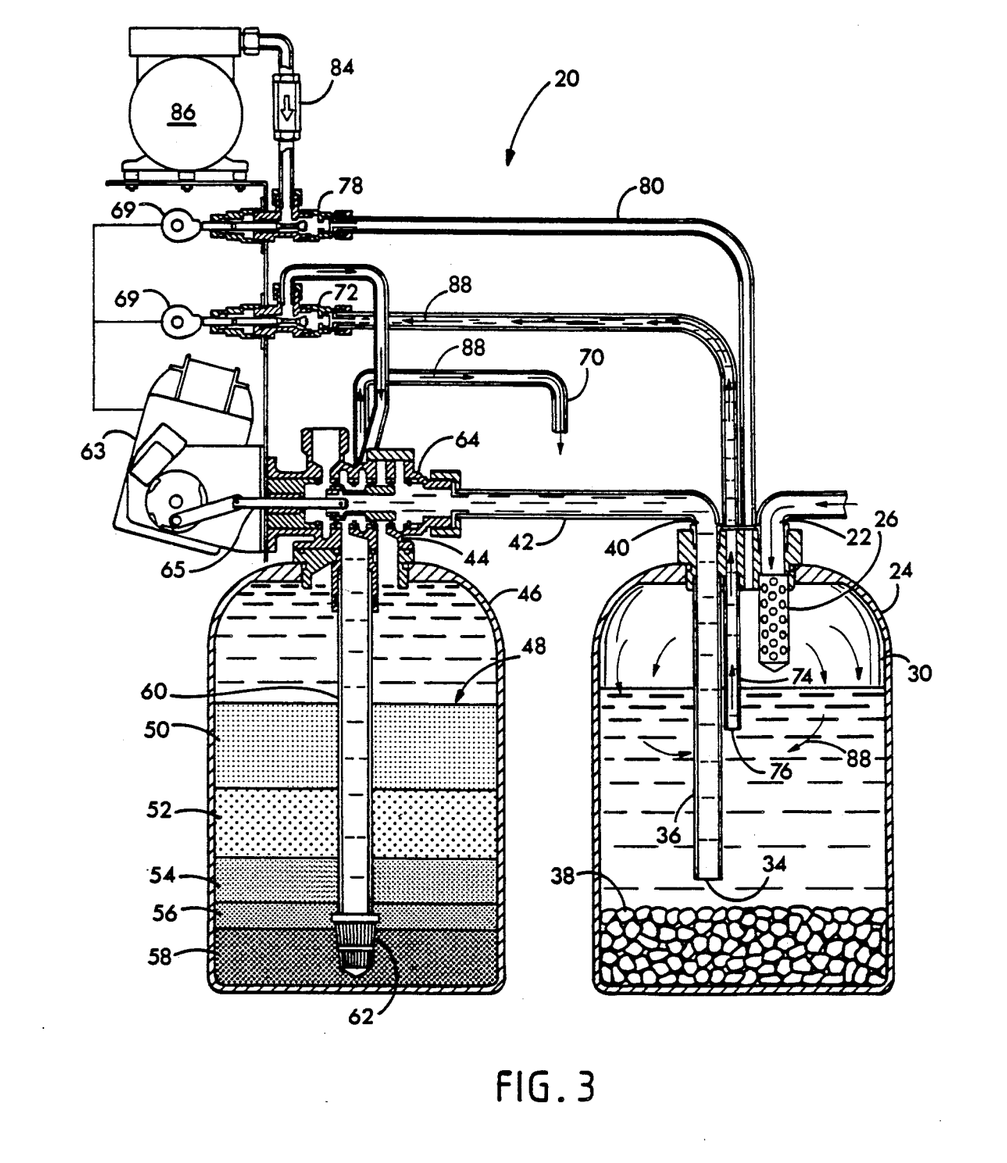
FIG. 3 is a schematic sectional view of the apparatus of FIG. 1 in the bleeding off aeration system position with arrows indicating the direction of water flow.

After backwashing the filter bed 48, an operation which bleeds off the aeration tank 24 takes place as shown in FIG. 3. The filter controller 63 closes the inlet 44 to the filter tank 46 which prevents water from the aeration tank 24 from entering the filter tank 46 and a drain valve 72 is opened connecting the bleed-off tube 74, which has an inlet 76 within the aeration tank 24, with the drain tube 70. At the same time, an air recharge valve 78 is opened in the air tube 80 which is connected to the air inlet 82 of the aeration tank 24. However, a check valve 84 prevents water from entering the air pump 86. Arrows 88 show the direction of water flow during bleed-off of the aeration tank 24. Raw water enters the aeration tank 24 at the inlet 22 and is sprayed into the tank through the diffuser 26. The water is drawn into the inlet 76 of the bleed-off tube 74 and is disposed of through the drain tube 70.

Figure 4:
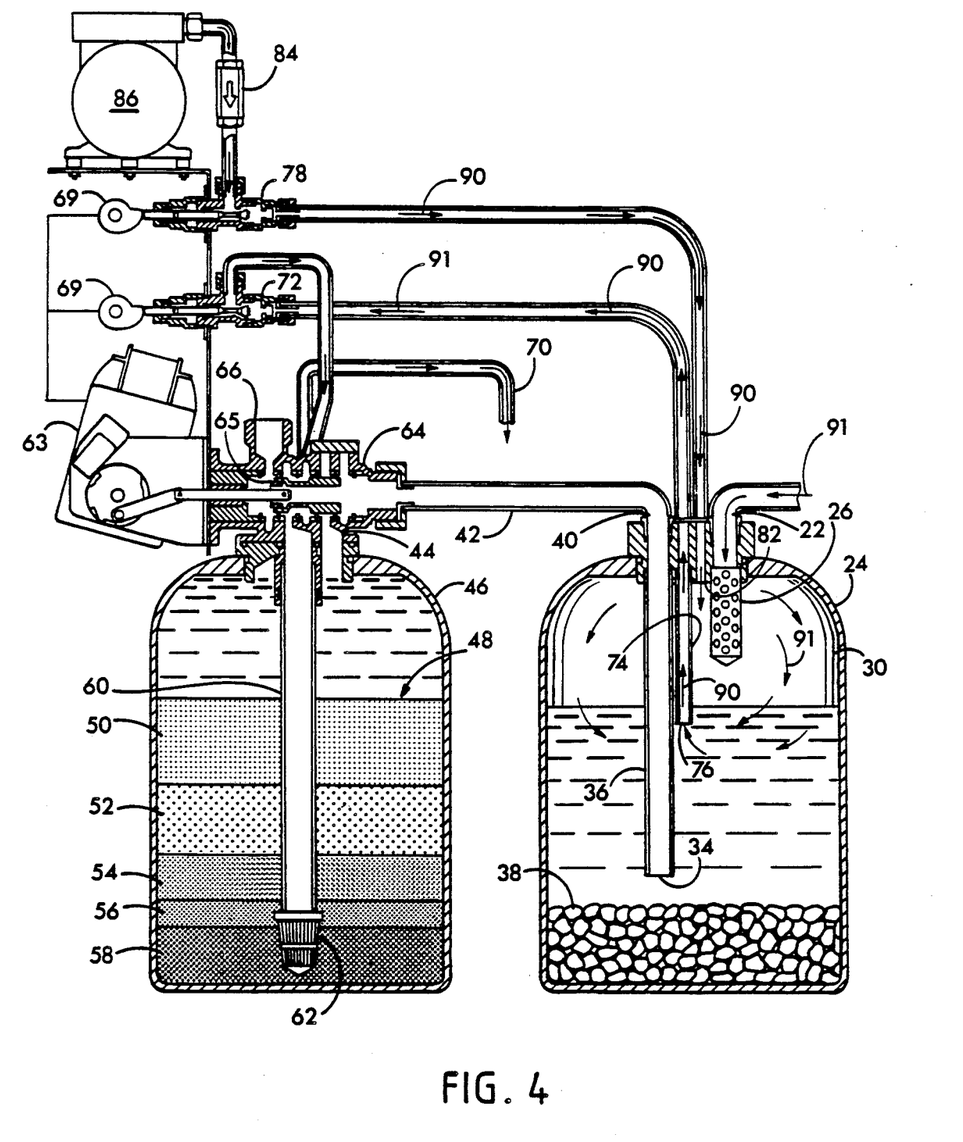
FIG. 4 is a schematic sectional view of the apparatus of FIG. 1 in the recharge position with arrows showing the direction of air and water flow.

After bleeding off the aeration system for approximately two to four minutes, the air pump 86 is activated as shown in FIG. 4. Arrows 90 show the direction of flow of the air. Arrows 91 show the flow of water. Air is pumped through the air recharge valve 78 directly into the aeration tank 24 through the air tube 80. The air is introduced to the aeration tank independently of the flow of water into the aeration tank. As the new air is pumped into the tank, it forces the old air downward in the aeration tank until it reaches the inlet 76 of the bleed-off tube 74 where it escapes up the bleed-off tube 74 and out of the aeration tank 24 to the drain tube 70. In this way, after a predetermined time, the aeration tank 24 will be completely recharged with new air and hence fresh oxygen.

It should be noted that while a pump for compressing atmospheric air is utilized in the preferred embodiment, a cannister of compressed air or oxygen, or other oxygen-rich gas may be substituted for the air pump.

Figure 5:
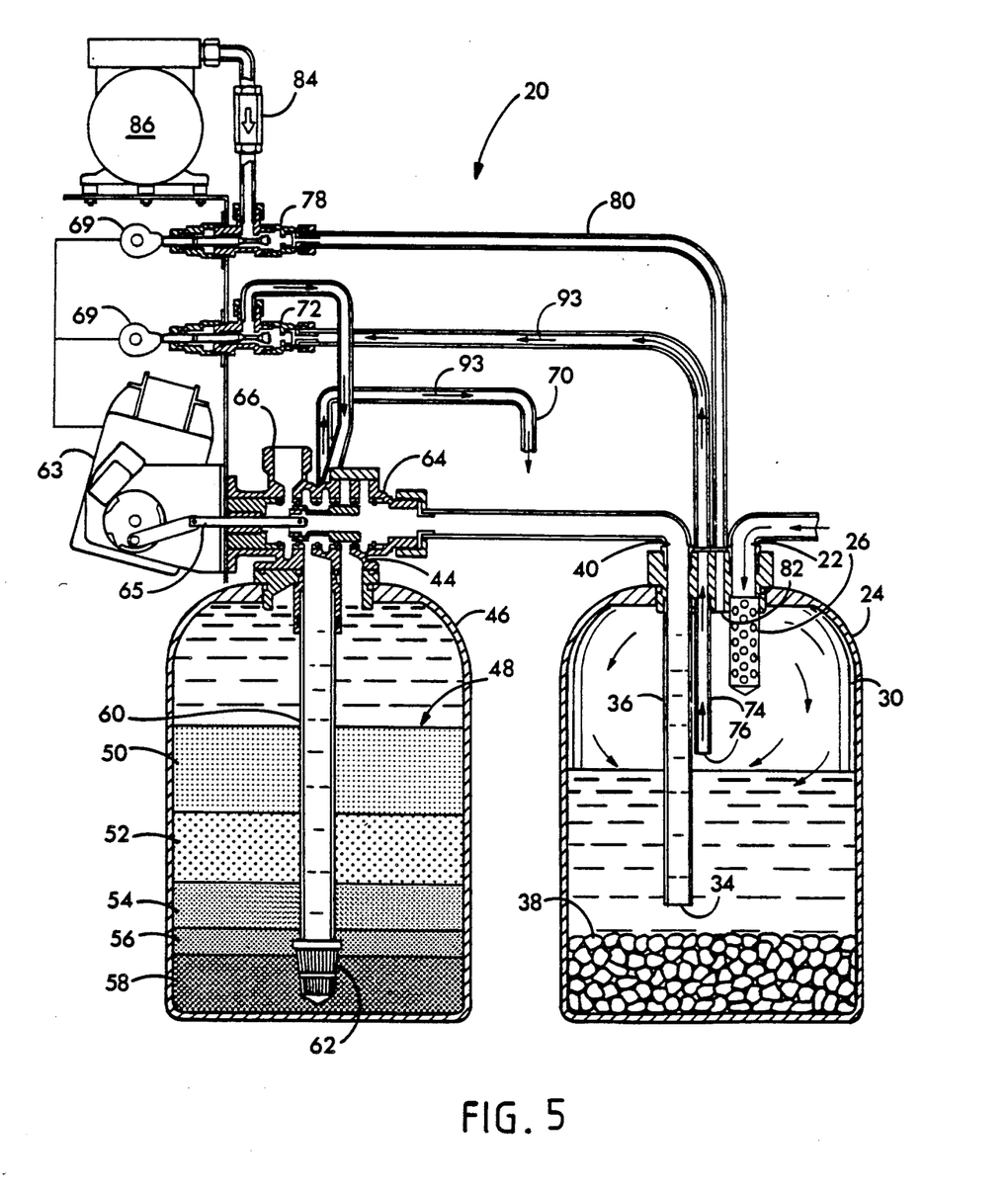
FIG. 5 is a schematic sectional view of the apparatus of FIG. 1 in a position to bleed off excess air with arrows showing the direction of air flow.

After a predetermined time of operation, the air pump 86 is shut off. The excess pressurized air, as shown in FIG. 5, which has been pumped into the aeration tank 24 and which has depressed the level of water within the aeration tank 24 below the level of the inlet 76 of the bleed-off tube 74 is allowed to bleed off through the bleed-off tube 74 and out the open drain valve 72 and out the drain tube 70. The direction of the air flow is indicated by arrows 93. Once the water level in the aeration tank 24 has reached the inlet of the bleed-off tube 74, the air head 30 will be at the proper system service pressure.

Figure 6:
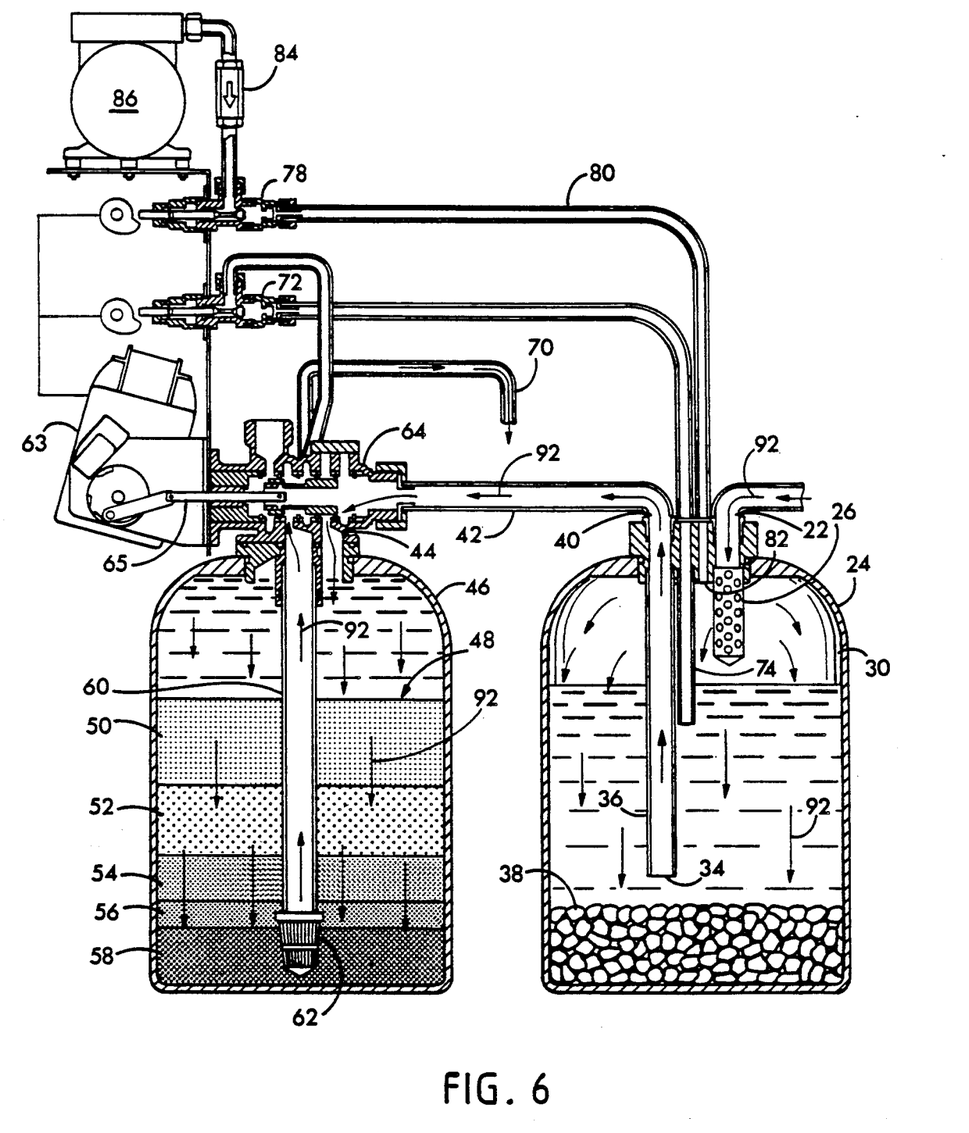
FIG. 6 is a schematic sectional view of the apparatus of FIG. 1 in a bedpacking position with arrows showing the direction of water flow.

Next, as shown in FIG. 6, the controller 63 closes the drain and recharge valves 72, 78 and opens the filter valve 64 to permit an increased rate of flow of water through the filter tank 46. The water flow, indicated by arrows 92, enters the pressurized aeration tank 24 down through the inlet diffuser 26, up through the pick-up tube 36 into the filter control 64, down through the multimedia filter bed 48, into the distributer tube 60 and out to the drain tube 70 at a predetermined controlled rate. The increased water flow acts to repack the filter bed 48 after it has been loosened by the bleed-off and backwash steps. After a predetermined time of operation in this increased flow cycle, the filter system returns to a service position as shown in FIG. 1.

An important advantage of the present filtration system is that the oxygen in the aeration tank may be recharged without the need for backwashing the filter tank.

Certain contaminated waters, for example, those with a high sulfur content, consume greater quantities of oxygen in forming precipitates. Such waters may consume the oxygen in the aeration tank long before the filtration media becomes clogged with precipitates.

To recharge the oxygen with minimal loss of filtering time the steps of bleeding off the aeration system and recharging the aeration tank with air described above may be performed on a schedule to be preset in the controller, without necessarily backwashing the filter tank 46.

A single air pump can thus supply the oxygen consumed by an increased flow of water or particularly contaminated waters by adjusting the frequency of the oxygen recharge—an operation which typically consumes only a fraction of an hour. It is also important to note that the air pump and aeration tank need not be dedicated to supplying a single filter tank. In large multi-tank installations, with suitable piping and valving, a single air pump can supply the oxygen needed to recharge an aeration tank for a number of connected filter tanks. The air pump or compressed air source may be located at a position removed from the aeration and filter tanks with a length of tubing connecting the pump to the aeration tank, if such a location is desired for convenience.

Figure 7:
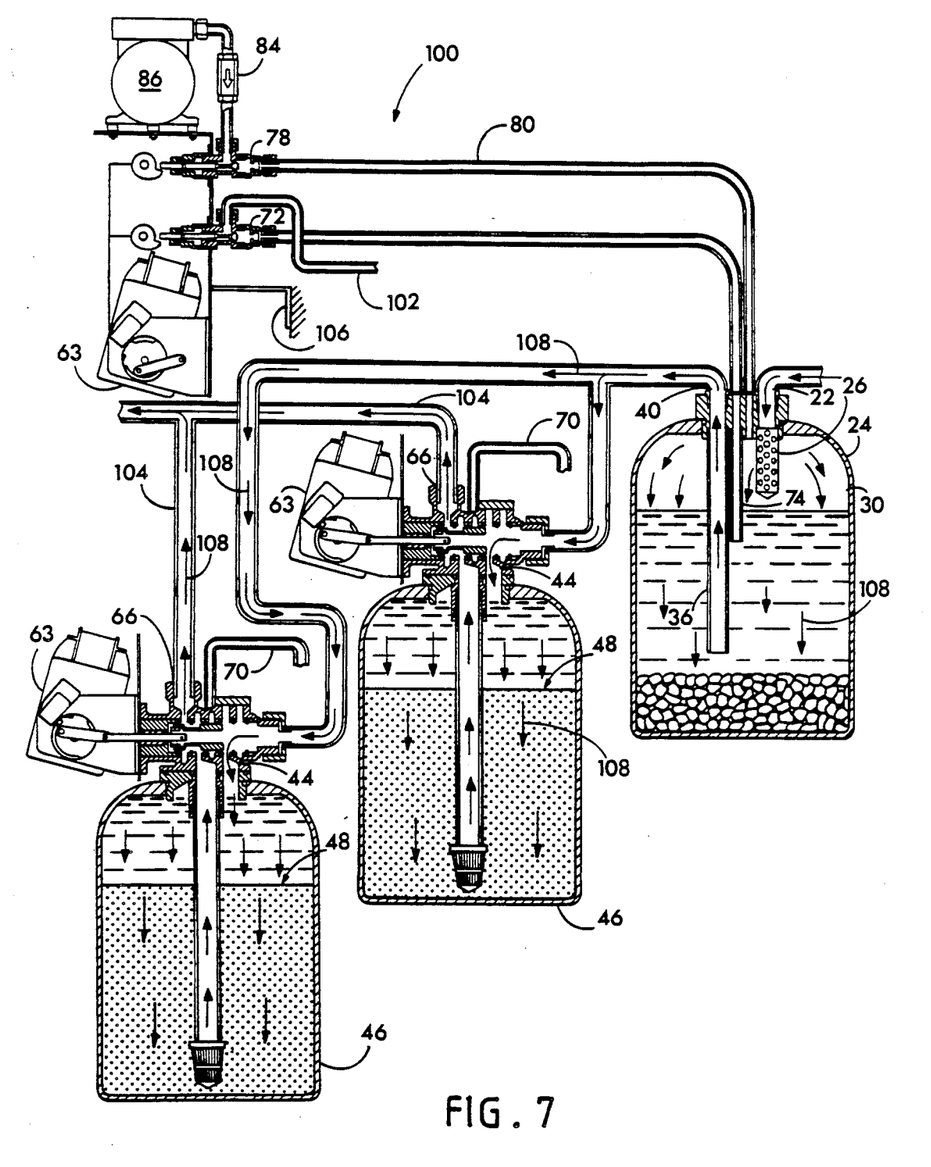
FIG. 7 is a schematic sectional view of a water filtration apparatus of this invention having multiple filter tanks.

The water filtration system 100, shown in FIG. 7, has one aeration tank 24 with two filter tanks 46 connected in parallel. The flow of water is indicated by the arrows 108. The aeration tank 24, and the filter tank 46 are as described above. Three controllers 63 are provided, one for each filter tank 46 and one to control the valves 72, 78. The drain valve 72 is connected to a drain pipe 102. The output pipes 104 from each filter tanks 46 may be directed to separate users of filtered water, or, as shown, may be connected to a manifold which provides a single output of water. The air pump 86 and the controllers 63 controlling the valves 72, 78 may be attached to a wall with a mounting bracket 106.

EXAMPLES

Water filtration systems constructed according to the preferred embodiment of this invention having a service flow rate of 3.6 gallons per minute at a continuous run with a filter tank 10" in diameter and 54" tall, was tested in accordance with "Voluntary Industry Standards for Household and Commercial Water Filters," Standard-200, published by the Water Quality Association. The test performance of the filtration system in removing iron contaminants is shown in Table 1.

TABLE 1

| Contaminant: Iron | | | |
|---|---|---|---|
| Meter Start | Gallons | Influent Level - (ppm) | Effluent Level - (ppm) |
| 0 | 0 | 10 | 0 |
| 50 | 50 | 10 | 0.05 |
| 100 | 100 | 10 | 0.05 |
| 150 | 150 | 10 | 0.05 |
| 200 | 200 | 10 | 0.05 |
| 250 | 250 | 10 | 0.05 |
| 300 | 300 | 10 | 0.05 |
| 350 | 350 | 10 | 0.05 |
| 400 | 400 | 10 | 0.05 |
| 450 | 450 | 10 | 0.05 |
| 500 | 500 | 10 | 0.05 |
| 550 | 550 | 10 | 0.05 |
| 600 | 600 | 10 | 0.05 |
| 650 | 650 | 10 | 0.05 |
| 700 | 700 | 10 | 0.05 |
| 750 | 750 | 10 | 0.05 |
| 800 | 800 | 10 | 0.05 |
| 850 | 850 | 10 | 0.05 |
| 900 | 900 | 10 | 0.05 |
| 950 | 950 | 10 | 0.05 |
| 1000 | 1000 | 10 | 0.05 |
| 1050 | 1050 | 10 | 0.05 |
| 1100 | 1100 | 10 | 0.05 |
| 1150 | 1150 | 10 | 0.05 |
| 1200 | 1200 | 10 | 0.05 |
| 1250 | 1250 | 10 | 0.05 |
| 1300 | 1300 | 10 | 0.05 |
| 1350 | 1350 | 10 | 0.05 |
| 1400 | 1400 | 10 | 0.05 |
| 1450 | 1450 | 10 | 0.05 |
| 1500 | 1500 | 10 | 0.05 |
| 1550 | 1550 | 10 | 0.05 |
| 1600 | 1600 | 10 | 0.05 |
| 1650 | 1650 | 10 | 0.05 |
| 1700 | 1700 | 10 | 0.05 |
| 1750 | 1750 | 10 | 0.05 |
| 1800 | 1800 | 10 | 0.05 |
| 1850 | 1850 | 10 | 0.05 |
| 1900 | 1900 | 10 | 0.05 |
| 1950 | 1950 | 10 | 0.05 |
| 2000 | 2000 | 10 | 0.05 |

The test performance of the water filtration system in removing manganese contaminants is shown in Table 2.

TABLE 2

| Contaminant: Manganese | | | |
|---|---|---|---|
| Meter Start | Gallons | Influent Level - (ppm) | Effluent Level - (ppm) |
| 2000 | 0 | 2 | 0 |
| 2050 | 50 | 2 | 0 |
| 2100 | 100 | 2 | 0 |
| 2150 | 150 | 2 | 0 |
| 2200 | 200 | 2 | 0.01 |
| 2250 | 250 | 2 | 0.01 |
| 2300 | 300 | 2 | 0.01 |
| 2350 | 350 | 2 | 0.01 |
| 2400 | 400 | 2 | 0.02 |
| 2450 | 450 | 2 | 0.02 |
| 2500 | 500 | 2 | 0.02 |
| 2550 | 550 | 2 | 0.02 |
| 2600 | 600 | 2 | 0.02 |
| 2650 | 650 | 2 | 0.02 |
| 2700 | 700 | 2 | 0.02 |
| 2750 | 750 | 2 | 0.02 |
| 2800 | 800 | 2 | 0.02 |
| 2850 | 850 | 2 | 0.02 |
| 2900 | 900 | 2 | 0.02 |
| 2950 | 950 | 2 | 0.02 |
| 3000 | 1000 | 2 | 0.02 |
| 3050 | 1050 | 2 | 0.02 |
| 3100 | 1100 | 2 | 0.02 |
| 3150 | 1150 | 2 | 0.02 |
| 3200 | 1200 | 2 | 0.02 |
| 3250 | 1250 | 2 | 0.02 |

TABLE 2-continued

Contaminant: Manganese

| Meter Start | Gallons | Influent Level - (ppm) | Effluent Level - (ppm) |
|---|---|---|---|
| 3300 | 1300 | 2 | 0.02 |
| 3350 | 1350 | 2 | 0.02 |
| 3400 | 1400 | 2 | 0.02 |
| 3450 | 1450 | 2 | 0.02 |
| 3500 | 1500 | 2 | 0.02 |
| 3550 | 1550 | 2 | 0.02 |
| 3600 | 1600 | 2 | 0.02 |
| 3650 | 1650 | 2 | 0.02 |
| 3700 | 1700 | 2 | 0.02 |
| 3750 | 1750 | 2 | 0.02 |
| 3800 | 1800 | 2 | 0.02 |
| 3850 | 1850 | 2 | 0.02 |
| 3900 | 1900 | 2 | 0.02 |
| 3950 | 1950 | 2 | 0.02 |
| 4000 | 2000 | 2 | 0.02 |

The test performance of the water filtration system in removing hydrogen sulfide contaminants is shown in Table 3.

TABLE 3

Contaminant: Hydrogen-Sulfide

| Meter Start | Gallons | Influent Level - (ppm) | Effluent Level - (ppm) |
|---|---|---|---|
| 4000 | 0 | 10 | 0 |
| 4050 | 50 | 10 | 0.06 |
| 4100 | 100 | 10 | 0.07 |
| 4150 | 150 | 10 | 0.07 |
| 4200 | 200 | 10 | 0.07 |
| 4250 | 250 | 10 | 0.07 |
| 4300 | 300 | 10 | 0.07 |
| 4350 | 350 | 10 | 0.07 |
| 4400 | 400 | 10 | 0.07 |
| 4450 | 450 | 10 | 0.07 |
| 4500 | 500 | 10 | 0.07 |
| 4550 | 550 | 10 | 0.07 |
| 4600 | 600 | 10 | 0.07 |
| 4650 | 650 | 10 | 0.07 |
| 4700 | 700 | 10 | 0.07 |
| 4750 | 750 | 10 | 0.07 |
| 4800 | 800 | 10 | 0.07 |
| 4850 | 850 | 10 | 0.07 |
| 4900 | 900 | 10 | 0.08 |
| 4950 | 950 | 10 | 0.08 |
| 5000 | 1000 | 10 | 0.08 |
| 5050 | 1050 | 10 | 0.08 |
| 5100 | 1100 | 10 | 0.09 |
| 5150 | 1150 | 10 | 0.09 |
| 5200 | 1200 | 10 | 0.09 |
| 5250 | 1250 | 10 | 0.09 |
| 5300 | 1300 | 10 | 0.09 |
| 5350 | 1350 | 10 | 0.09 |
| 5400 | 1400 | 10 | 0.12 |
| 5450 | 1450 | 10 | 0.12 |
| 5500 | 1500 | 10 | 0.12 |
| 5550 | 1550 | 10 | 0.14 |
| 5600 | 1600 | 10 | 0.14 |
| 5650 | 1650 | 10 | 0.14 |
| 5700 | 1700 | 10 | 0.14 |
| 5750 | 1750 | 10 | 0.17 |
| 5800 | 1800 | 10 | 0.17 |
| 5850 | 1850 | 10 | 0.2 |

The effect of the tested water filtration system on pH level with a six-layer multimedia filter bed having a layer of magnesia is shown in Table 4.

TABLE 4

Condition: pH 6.0–6.2

| Meter Start | Gallons | Influent pH | Effluent pH |
|---|---|---|---|
| 711940 | 0 | 6.1 | >6.8 |
| 711990 | 50 | 6.1 | >6.8 |
| 712040 | 100 | 6.1 | >6.8 |
| 712090 | 150 | 6.1 | >6.8 |
| 712140 | 200 | 6.1 | >6.8 |
| 712190 | 250 | 6.1 | >6.8 |
| 712240 | 300 | 6.1 | >6.8 |
| 712290 | 350 | 6.1 | >6.8 |
| 712340 | 400 | 6.1 | >6.8 |
| 712390 | 450 | 6.1 | >6.8 |
| 712440 | 500 | 6.1 | >6.8 |

It is understood that the invention is not confined to the particular construction and arrangement of parts herein illustrated and described, but embraces such modified forms thereof as come within the scope of the following claims.

We claim:

1. In an apparatus for precipitating mineral contaminants from water, having
    an aeration tank having a top and an inlet at the top for admitting water from a supply of water to the aeration tank and an outlet for discharging water;
    a diffuser through which water from the inlet is sprayed within the aeration tank; and
    an air head within the aeration tank into which the contaminated water is sprayed; the improvement comprising:
    (a) a source of compressed oxygen-rich gas in direct communication with the top of the aeration tank; and
    (b) a means for controlling the source of compressed oxygen-rich gas to permit oxygen to be supplied independently of the water supply to the interior of the aeration tank for recharging the aeration tank with oxygen.

2. The apparatus of claim 1, further comprising:
    (a) a pick-up tube with an open end located within the aeration tank and connected to the outlet of the aeration tank;
    (b) a filter tank with an inlet connected to the pick-up tube of the aeration tank and with an outlet adapted to be connected to a water supply line;
    (c) a multimedia filter bed within the filter tank having a plurality of filtration layers; and
    (d) a distributor tube connected to the outlet of the filter tank with an opening within the multimedia filter bed, wherein the oxygenated water may be drawn through the multimedia filter bed so that a significant portion of the contaminants may be removed from the water and the filtered water may be supplied to the outlet of the filter tank.

3. The apparatus of claim 1 wherein the diffuser has a plurality of holes through which the water is sprayed into the aeration tank.

4. The apparatus of claim 1 further comprising:
    (a) a bleed-off tube with an entrance extending a fixed depth into the aeration tank such that during filtration operation of the apparatus the entrance is submerged within water contained within the aeration tank;
    (b) a valve located between the bleed-off tube and the exterior of the apparatus for selectively draining air and water from the aeration tank.

5. The apparatus of claim 1 further comprising a plurality of filter tanks connected to the outlet of the aeration tank such that water is supplied by the aeration tank to all the filter tanks, and wherein the filter tanks have multimedia filter beds for removing precipitated contaminants from the water.

6. The apparatus of claim 1 further comprising a bed of calcium carbonate chips positioned inside the aeration tank beneath the spray of water from the diffuser.

7. An apparatus for precipitating mineral contaminants from water, comprising:
   (a) an aeration tank having a top and an inlet at the top for admitting water from a supply of water to the aeration tank and an outlet for discharging water;
   (b) a diffuser through which water from the inlet is sprayed within the aeration tank;
   (c) an air head within the aeration tank into which the contaminated water is sprayed;
   (d) a source of compressed oxygen-rich gas in direct communication with the top of the aeration tank; and
   (e) a means for controlling the source of compressed oxygen-rich gas to permit oxygen to be supplied independently of the water supply to the interior of the aeration tank for recharging the aeration tank with oxygen;
   (f) a pick-up tube with an open end located within the aeration tank and connected to the outlet of the aeration tank;
   (g) a filter tank with an inlet connected to the pick-up tube of the aeration tank and with an outlet adapted to be connected to a water supply line;
   (h) a multimedia filter bed within the filter tank having a plurality of filtration layers, wherein the multimedia filter bed comprises
   a layer of aluminum silicate,
   a layer of manganese dioxide-coated pumicite,
   a layer of fine filter sand,
   a layer of garnet sand, and
   a garnet support bed layer with an effective mesh size of 8-12 millimeters; and
   (i) a distributor tube connected to the outlet of the filter tank with an opening within the multimedia filter bed, wherein the oxygenated water may be drawn through the multimedia filter bed so that a significant portion of the contaminants may be removed from the water and the filtered water may be supplied to the outlet of the filter tank.

8. In a process for removing mineral contaminants from water, having the steps of:
   spraying the contaminated water through a diffuser into a container having an airhead of at least six inches at system pressure; and
   drawing the water through a multimedia filter bed to remove the oxydized contaminants from the water;
   an improved process comprising the step of
   pumping oxygen-rich gas directly into the container independently of the flow of water to recharge the airhead with new oxygen when the oxygen within the container is depleted.

9. In an apparatus for recharging the air head of the aeration tank of an apparatus for precipitating mineral contaminants from water, having an aeration tank with a water supply, the improvement comprising:
   (a) a source of compressed oxygen-rich gas in direction communication with the top of the aeration tank; and
   (b) a means for controlling the source of compressed oxygen-rich gas to permit oxygen to be supplied independently of the water supply to the interior of the aeration tank for recharging the aeration tank with oxygen.

10. In an apparatus for recharging the air head of an aeration tank in an apparatus for the removal of mineral contaminants from water having an aeration tank with an interior, a drain pipe in fluid communication with the interior of the aeration tank, and a valve for alternately permitting and restricting the escape of fluid from the aeration tank through the drain pipe, the improvement comprising:
   (a) an air pump connected to the top of the aeration tank wherein the air pump may supply compressed air to the aeration tank;
   (b) a valve for alternately permitting and restricting air flow from the pump to the aeration tank; and
   (c) a controller which activates the air pump when it is desired to recharge the air head and which controls the valves during the recharge to permit air flow from the pump to the aeration tank and to permit the escape of fluid from the aeration tank through the drain pipe.

* * * * *

REEXAMINATION CERTIFICATE (2688th)

United States Patent [19]

Hellenbrand et al.

[11] B1 5,096,596

[45] Certificate Issued Oct. 3, 1995

[54] PROCESS AND APPARATUS FOR REMOVAL OF MINERAL CONTAMINANTS FROM WATER

[75] Inventors: Terence P. Hellenbrand; Jeffrey J. Hellenbrand, both of Waunakee, Wis.

[73] Assignee: Hellenbrand Water Conditioners, Inc., Waunakee, Wis.

Reexamination Request
No. 90/003,376, Mar. 29, 1994

Reexamination Certificate for:
Patent No.: 5,096,596
Issued: Mar. 17, 1992
Appl. No.: 544,328
Filed: Jun. 27, 1990

[51] Int. Cl.⁶ ............................................. C02F 1/64
[52] U.S. Cl. .................... 210/721; 210/722; 210/771; 210/806; 210/807; 210/202; 210/209; 210/218; 210/259; 210/295; 210/138; 210/139
[58] Field of Search ...................... 210/721, 722, 210/209, 206, 202, 259, 664, 665, 750, 89, 105, 170, 98, 139, 138, 143, 150, 290, 151, 771, 806, 807, 218, 295, 669, 279, 284, 668, 912, 266; 95/255; 261/115

[56] References Cited

U.S. PATENT DOCUMENTS

| | | | |
|---|---|---|---|
| 1,100,675 | 6/1914 | Hackl | 210/722 |
| 1,985,010 | 12/1934 | Berkhuijsen | 261/115 |
| 1,990,214 | 2/1935 | Zapffe | 210/722 |
| 2,128,311 | 8/1938 | Mertes | 210/722 |
| 2,237,882 | 4/1941 | Lawlor et al. | 210/722 |
| 2,239,612 | 4/1941 | Lawlor | 210/257.1 |
| 2,268,076 | 12/1941 | Lawlor | 210/257.1 |
| 2,370,772 | 3/1945 | Bowers | 210/16 |
| 2,439,764 | 4/1948 | Walker | 210/722 |
| 2,872,415 | 2/1959 | Schleyer et al. | 261/115 |
| 3,151,064 | 9/1964 | Lathrop | 261/115 |
| 3,649,532 | 3/1972 | McLean | 210/722 |
| 4,139,456 | 2/1979 | Yabmuchi et al. | 210/722 |
| 4,305,826 | 12/1981 | Moses | 210/290 |
| 4,322,299 | 3/1982 | Scholten et al. | 210/290 |
| 4,430,228 | 2/1984 | Paterson | 210/722 |
| 4,534,867 | 8/1985 | Kreusch et al. | 210/722 |
| 4,659,463 | 4/1987 | Chandler et al. | 210/722 |
| 4,818,404 | 4/1989 | McDowell | 210/603 |
| 4,826,601 | 5/1989 | Spratt et al. | 210/610 |
| 4,839,057 | 6/1989 | White | 210/721 |
| 4,885,084 | 12/1989 | Doyle | 210/132 |
| 4,966,692 | 10/1990 | Overy | 210/123 |
| 4,992,181 | 2/1991 | Siebert | 210/744 |
| 5,096,580 | 3/1992 | Auchincloss | 210/202 |
| 5,147,530 | 9/1992 | Chandler et al. | 210/258 |

OTHER PUBLICATIONS

Iron curtain system, diagram of system manufactured by Hellenbrand Water Conditioners, Inc. of Waunakee, Wis.

*Primary Examiner*—Cynthia L. Nessler

[57] ABSTRACT

An apparatus for removing mineral contaminants from water is disclosed which has an aeration tank connected to a supply of water and having an inlet for admitting the water to the aeration tank and an outlet for discharging water. A diffuser is connected to the aeration tank inlet and has a plurality of apertures which permit the diffusion of the contaminated water into an airhead within the aeration tank. A source of compressed oxygen is in direct communication with the top of the aeration tank. A controller controls the source of compressed air to permit oxygen to be supplied independently of the water supply to the interior of the aeration tank for recharging the aeration tank with oxygen. A bed of calcium carbonate chips may be positioned inside the aeration tank beneath the spray of contaminated water. A pick-up tube has an open end located above the bed of calcium carbonate chips and is connected to the outlet of the aeration tank. A filter tank has an inlet connected to the pick-up tube of the aeration tank and an outlet adapted to be connected to a water supply line. The system has a distributor tube connected to the outlet of the filter tank with an opening within the multimedia filter bed, wherein the oxygenated water may be drawn through the multimedia filter bed so that a significant portion of the contaminants may be removed from the water and the filtered water may be supplied to the outlet of the filter tank. The system has a multimedia filter bed positioned within the filter tank which has a plurality of filtration layers.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, 8, 9 and 10 are determined to be patentable as amended.

Claims 2, 3, 4, 5 and 6, dependent on an amended claim, are determined to be patentable.

New claim 11 is added and determined to be patentable.

1. In [an] *a water filtration* apparatus for precipitating mineral contaminants from *well or city main* water, having an aeration tank having a top and an inlet at the top [for admitting water from] *connected to* a supply of *said* water [to the aeration tank], and an outlet for discharging water;

a diffuser *connected to the inlet* through which water from the inlet is sprayed within the aeration tank; and an air head within the aeration tank into which the contaminanted water is sprayed; the improvement comprising:

(a) a source of compressed oxygen-rich gas in direct communication with the *air head at the* top of the aeration tank; and (b) a means for controlling the source of compressed oxygen-rich gas to permit oxygen to be supplied independently of the water supply to the interior of the aeration tank for recharging the aeration tank with oxygen, *said means including a controller having a clock means for automatic actuation of the source of compressed oxygen-rich gas at preselected times.*

7. An apparatus for precipitating mineral contaminants from water, comprising:

(a) an aeration tank having a top and an inlet at the top for admitting water from a supply of water to the aeration tank and an outlet for discharging water;

(b) a diffuser *connected to the inlet* through which water from the inlet is sprayed within the aeration tank;

(c) an air head within the aeration tank into which the contaminated water is sprayed;

(d) a source of compressed oxygen-rich gas in direct communication with the top of the aeration tank; and (e) a means for controlling the source of compressed oxygen-rich gas to permit oxygen to be supplied independently of the water supply to the interior of the aeration tank for recharging the aeration tank with oxygen, *said means including a controller having a clock means for automatic actuation of the source of compressed oxygen-rich gas at preselected times*;

(f) a pick-up tube with an open end located within the aeration tank and connected to the outlet of the aeration tank;

(g) a filter tank with an inlet connected to the pick-up tube of the aeration tank and with an outlet adapted to be connected to a water supply line;

(h) a multimedia filter bed within the filter tank having a plurality of filtration layers, wherein the multimedia filter bed comprises
   a layer of aluminum silicate,
   a layer of manganese dioxide-coated pumicite,
   a layer of fine filter sand,
   a layer of garnet sand, and a garnet support bed layer with an effective mesh size of 8–12 millimeters; and (i) a distributor tube connected to the outlet of the filter tank with an opening within the multimedia filter bed, wherein the oxygenated water may be drawn through the multimedia filter bed so that a significant portion of the contaminants may be removed from the water and the filtered water may be supplied to the outlet of the filter tank.

8. In a process for removing mineral contaminants from [water] *a supply of pressurized water from a well or city main*, having the steps of:

spraying [the] *all of the received* contaminated water through a diffuser into a container having an airhead of at least six inches at system pressure; and drawing the water through a multimedia filter bed to remove the [oxydized] *oxidized* contaminants from the water;

an improved process comprising the step of pumping *an* oxygen-rich gas *flow* directly into the container [independently] *for a predetermined, automatically controlled period of time, said oxygen-rich gas flow being independent* of the flow of water *so as to recharge the airhead with new oxygen when the oxygen within the container is depleted.*

9. In an apparatus for recharging the *air head of an aeration tank in a water filtration apparatus for precipitating mineral contaminants from a flow of pressurized water from a well or city main of the type having an* air head [of the] *in the top of an* aeration tank [of an apparatus for precipitating mineral contaminants from water, having an aeration tank with a water supply], *wherein the entire flow of water to be treated flows through the aeration tank*, the improvement comprising:

(a) a source of compressed oxygen-rich gas in [direction] *direct* communication with the *air head in the* top of the aeration tank; and (b) a means for controlling the source of compressed oxygen-rich gas to *automatically* permit oxygen to be supplied independently of the water supply to the interior of the aeration tank for recharging the aeration tank with oxygen, *said means including a controller having a clock means for automatic actuation of the source of compressed oxygen-rich gas at preselected times.*

10. In an apparatus for recharging the air head of an aeration tank [in an apparatus for the removal of mineral contaminants from water having] *in a water filtration apparatus for precipitating mineral contaminants from pressurized water received from a well or city main, the apparatus including* an aeration tank with an *inlet for receiving the entire flow of water to be treated and an* interior, a drain pipe in fluid communication with the interior of the aeration tank, [and] *the improvement comprising:*

(*a*) a valve, *said valve defining a means* for alternately permitting and restricting the escape of [fluid] *water* from the aeration tank through the drain pipe[, the improvement comprising:] *;*

[(a)] (*b*) an air pump, *said air pump defining a means* connected to the top of the aeration tank [wherein the air pump may supply] *for supplying* compressed air to the *air head of the* aeration tank *independently of the flow of water to the inlet*;

[(b) a] *(c) an air* valve, *said air valve defining a means* for alternately permitting and restricting air flow from the pump to the aeration tank; and

[(c)] *(d)* a controller [which activates] *having a clock means for automatically activating* the air pump *at preselected times* when it is desired to recharge the air head [and which controls] , *the clock means having the function of controlling* the [valves] *air valve* during [the] recharge [to permit] *and permitting* air flow from the pump to *the air head of* the aeration tank and [to permit] *permitting* the escape of [fluid] *water* from the aeration tank through the drain pipe.

11. *In a water filtration apparatus for precipitating mineral contaminants from a flow of water from a supply of water from a well or city main, the apparatus having:*

*an aeration tank with a top, an interior, and an outlet for discharging water, wherein the entire flow of water to be treated flows through the aeration tank;*

*an aeration tank inlet at the top of the aeration tank for admitting water from the supply of water, wherein the aeration tank inlet is connected to the supply of water;*

*an air head in the top of the aeration tank in to which the contaminated water is sprayed;*

*a diffuser, said diffuser defining a means for spraying water through the aeration tank inlet into the air head in the aeration tank, wherein the diffuser is connected to the aeration tank inlet, the improvement comprising:*

(a) *a first valve means for supplying air to the air head;*

(b) *a source of compressed oxygen-rich gas which is an air pump, wherein the air pump is connected by the first valve means to be in direct communication with the air head at the top of the aeration tank;*

(c) *a drain;*

(d) *a bleed-off tube which extends to the drain;*

(e) *an opening in the aeration tank through which the bleed-off tube extends;*

(f) *a second valve means for selectively permitting and obstructing flow from the aeration tank through the bleed-off tube to the drain;*

(g) *an aeration tank outlet;*

(h) *a pick-up means for supplying a flow of oxygenated water, wherein the pick-up means has an open end located within the aeration tank and connected to the aeration tank outlet;*

(i) *a filter tank having an inlet and an outlet, wherein the filter tank inlet is connected to the outlet of the aeration tank by the pick-up means to receive a flow of oxygenated water from the aeration tank;*

(j) *a filtered water supply line connected to the filter tank outlet;*

(k) *a filter bed means within the filter tank for removing a least a portion of contaminants from the oxygenated water within the filter tank;*

(l) *a distributor tube means connected to the outlet of the filter tank, wherein the distributor tube means has an opening positioned within the filter bed means to draw oxygenated water through the filter bed means;*

(m) *a third valve means connected between the aeration tank and the filter tank for actuating a reversal of the flow through the filter bed means of the oxygenated water from the pickup means;*

(n) *a means for controlling the source of compressed oxygen-rich gas to permit oxygen to be supplied independently of the water supply to the interior of the aeration tank for recharging the aeration tank with oxygen, wherein the means for controlling has a means for actuating the first valve means, the second valve means, the third valve means, and the air pump at preselected times to bleed off the air head, recharge the air head, and backwash the filter bed means, and wherein a water flow path is defined between the supply of water and the drain, without a venturi, to allow unaffected backwash of the filter bed means.*

\* \* \* \* \*